W. R. MacGUYER.
COASTER BRAKE.
APPLICATION FILED NOV. 18, 1908.
952,622.
Patented Mar. 22, 1910.
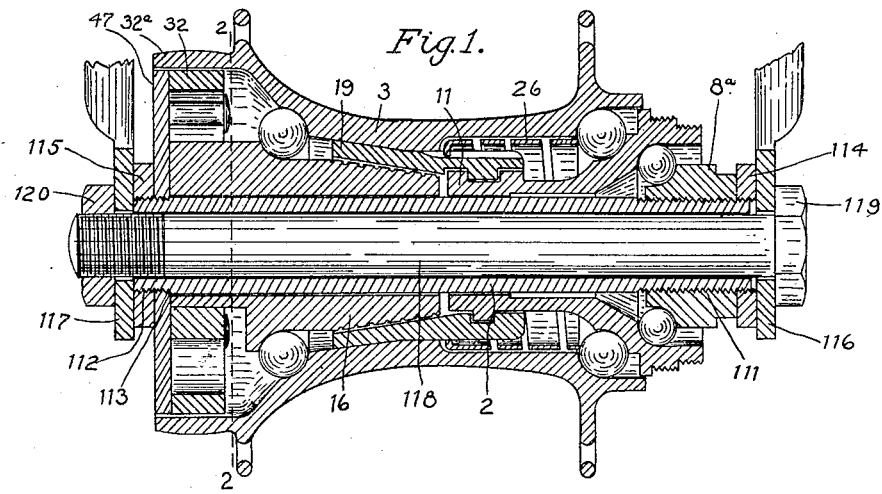
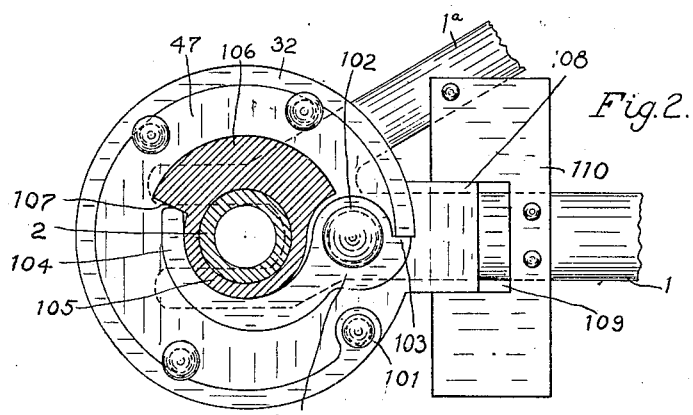
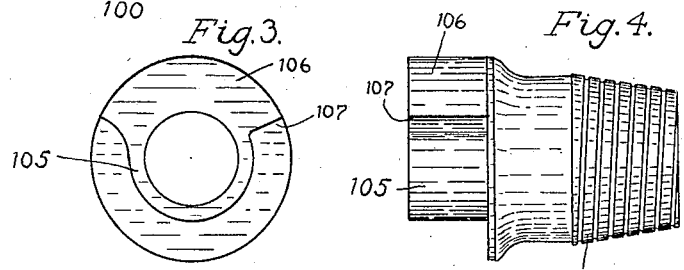
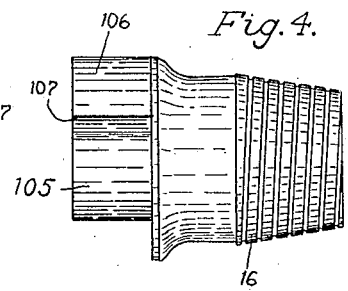
WITNESSES:
John W. Bryce
Fred A. Mitchell
INVENTOR:
Woodford R. MacGuyer,
BY
Gales Thum
his ATTORNEY

UNITED STATES PATENT OFFICE.

WOODFORD R. MacGUYER, OF WATERBURY, CONNECTICUT, ASSIGNOR TO THE NEW DEPARTURE MANUFACTURING COMPANY, OF BRISTOL, CONNECTICUT, A CORPORATION OF CONNECTICUT.

COASTER-BRAKE.

952,622.　　　　Specification of Letters Patent.　　Patented Mar. 22, 1910.

Application filed November 18, 1908. Serial No. 463,228.

*To all whom it may concern:*

Be it known that I, WOODFORD R. MAC-GUYER, a citizen of the United States, residing at Waterbury, county of New Haven, State of Connecticut, have invented certain new and useful Improvements in Coaster-Brakes, of which the following is a full, clear, and exact description, such as will enable others skilled in the art to which it appertains to make and use the same, reference being had to the accompanying drawings, forming part of this specification.

My invention relates to improvements in coaster brakes.

One object is to provide for the easy insertion of the coaster brake hub in the frame of a bicycle and the easy removal of the same therefrom.

Another object is to provide for the removal of the coaster brake hub from the bicycle frame without the disturbance of the adjustment of the parts of such coaster brake mechanism.

To these ends and also to improve generally upon devices of the character indicated, my invention consists of the various matters herein described and claimed.

In the accompanying drawings: Figure 1 is a sectional elevation, a portion of the frame of a bicycle being illustrated; Fig. 2 is an elevation of certain of the parts upon substantially the line 2—2 of Fig. 1, the brake-actuator and the axle being shown in section and a portion of the bicycle frame being indicated; Fig. 3 is an end elevation of the brake-actuator; and Fig. 4 is a side elevation of the same.

My invention is here illustrated in connection with a mechanism generally similar in construction and operation to that disclosed in patent to Rockwell, No. 745524, to which reference is made for a more detailed explanation of the general structure.

The axle 2 is supported upon the bicycle frame and the hub-shell 3 rotates about the same. Said hub-shell, the threaded driver 11, the laterally shiftable clutch sleeve 19, the lag spring 26, and the cone 8ª are substantially similar in construction and operation to the corresponding parts disclosed in the said patent to Rockwell. Also, the brake-plate 47, the brake-ring 32 supported by said plate, and the brake-actuator 16 are generally similar to the corresponding parts in the said Rockwell patent, there being a suitable lever 100 interposed between the said brake-actuator and said brake ring. Therefore, when forward pedaling occurs the driver 11 rotates with the sprocket-wheel, and the clutch sleeve 19 is drawn to the right to engage and rotate the hub 3; when the feet are held stationary coasting occurs; and back pressure upon the pedals causes said clutch sleeve 19 to shift to the left into engagement with the brake-actuator 16, whereupon said brake-actuator is rocked backwardly, thus in turn rocking the lever 100 and spreading the anchored brake-ring 32 into braking engagement with the brake drum 32ª of the hub; all as will be clearly understood upon reference to the said Rockwell patent.

In the illustrated structure the brake-ring 32, having one end fastened to the brake-plate at 101, has what may be termed its rear end engaged by the arm 103 of the said lever 100, this lever being pivoted upon the stud 102 and having its arm 104 lying about the portion 105 of the said brake-actuator 16 so that the end of said arm 104 is engaged by the shoulder 107 produced between the portions 105 and 106 of said brake-actuator.

Manifestly, this brake can be applied to other than coaster brake mechanisms.

The brake-plate 47 is provided with an arm or tongue 108 which is received in a recess 109 in an anchoring-plate or anchor 110 non-rotatably supported upon the bicycle frame in any suitable manner, as by being riveted to the frame tubes 1 and 1ª. This securely holds the brake-plate against rotation and provides for easy application of the brake mechanism to and removal from the bicycle, it being only necessary to slip the arm 108 into the socket 109 of the anchored plate when the mechanism is being attached to the bicycle and to merely pull said arm from this socket when the mechanism is being removed from the machine.

I have illustrated the axle 2 as hollow and provided at its ends with exterior threads 111 and 112, there preferably being a shoulder 113 between the body portion of the axle 2 and its reduced end which is provided with said threads 112. The threads 112 screw into the said brake-plate 47 until said shoulder abuts against said plate, and the threads 111 receive the said cone 8ª. Thus, when the parts are assembled upon this axle, said axle and the assembled parts of the coaster brake can be handled as a unit. Preferably the ends of the axle receive lock nuts 114 and 115 to prevent displacement of the cone and brake-plate. Said axle is of a length adapted to be received between the forks 116 and 117 of the bicycle. A bolt 118, passing through said hollow axle 2, is of a length greater than the distance between said forks and has means, such as a head 119 and the nut 120, for engaging the outer sides of the respective forks, so that said forks can be clamped between the axle 2 and the said securing means 119 and 120 upon said bolt. Thus, when removing the coaster brake hub from the bicycle frame it is unnecessary to disturb any of the coaster brake mechanism or to disturb the adjustment of the same, a mere withdrawal of the bolt 118 permitting the coaster brake hub as a unit to be removed. Of course, the same advantage is true with relation to inserting the mechanism in the bicycle. Furthermore, when it is desired to remove the coaster brake the withdrawal of said bolt permits the hub to move forwardly, thus slacking the chain between the usual hub sprocket-wheel and driving sprocket-wheel of the bicycle, so that the chain can be readily slipped from one or both of said sprocket-wheels.

Having thus described my invention, what I claim as new and desire to secure by Letters Patent is:

1. In a bicycle or the like, a frame, a wheel hub supported thereon, a brake plate, a brake for said hub supported upon said plate, a brake anchor supported upon said frame and provided with a socket opening upon an edge of said anchor, and a tongue upon said brake plate and slidably received in said socket of said anchor; substantially as described.

2. In a bicycle or the like, a frame, a wheel hub supported thereon, a brake plate, a brake for said hub supported upon said plate, a brake anchor supported upon said frame in advance of said hub and provided with a socket opening upon the rear edge of said anchor, and a forwardly extending tongue upon said brake plate and slidably received in said socket of said anchor, said tongue having forward movement in said socket from the adjusted position of the recited parts; substantially as described.

3. The combination with a hollow axle, of bearing members secured thereon, a hub mounted upon said bearing members and secured against displacement with respect thereto, brake mechanism mounted upon said axle and secured against displacement with respect thereto, and a bolt received in said hollow axle and separable therefrom and adapted to be secured to the frame of the vehicle; substantially as described.

4. The combination with a hollow axle, of bearing members secured thereon, a hub mounted upon said bearing members and secured against displacement with respect thereto, a brake plate secured on said axle, a brake carried by said plate, brake operating mechanism supported about said axle and confined between said brake plate and one of said bearing members, and a bolt in said hollow axle and separable therefrom and adapted to be secured to the frame of the vehicle; substantially as described.

5. The combination with a hollow axle having a shoulder, of bearing members secured thereon, a hub mounted upon said bearing members and secured against displacement with respect thereto, a brake plate secured on said axle and abutting against said shoulder, a brake carried by said plate, brake operating mechanism supported about said axle and confined between said brake plate and one of said bearing members, and a bolt in said hollow axle and separable therefrom and adapted to be secured to the frame of the vehicle; substantially as described.

In testimony whereof, I hereunto affix my signature, in the presence of two witnesses.

WOODFORD R. MacGUYER.

Witnesses:
FRED A. MITCHELL,
GALES P. MOORE.